United States Patent [11] 3,611,289

[72] Inventors Edward M. Richards
Commack;
Edward Krummenacker, Smithtown;
Francis C. Marino, Huntington, all of N.Y.
[21] Appl. No. 809,253
[22] Filed Mar. 21, 1969
[45] Patented Oct. 5, 1971
[73] Assignee Digitronics Corporation
Albertson, N.Y.

[54] ERROR DETECTION APPARATUS
13 Claims, 4 Drawing Figs.

[52] U.S. Cl. .......... 340/146.1
[51] Int. Cl. .......... G08c 25/00
[50] Field of Search .......... 340/146.1, 172.5; 235/153; 179/15

[56] References Cited
UNITED STATES PATENTS

| | | | |
|---|---|---|---|
| 3,354,429 | 11/1967 | Macon et al. .......... | 340/172.5 |
| 3,470,326 | 9/1969 | Gretteberg .......... | 340/146.1 X |
| 2,970,189 | 1/1961 | Van Dalen et al. .......... | 340/146.1 X |

*Primary Examiner*—Malcolm A. Morrison
*Assistant Examiner*—Charles E. Atkinson
*Attorney*—Yuter and Spiecens

ABSTRACT: Error-detection apparatus for a transmission system of the type having means for transmitting data in the form of sequential characters comprising combinations of first and second signals wherein each character has the same characteristic and the characters are spaced from each other by an intercharacter signal represented by a preselected signal. The apparatus includes means for storing an intercharacter signal which follows a received character having said characteristic and comparing means for comparing the stored signal with the intercharacter signal following the next character having said characteristic and for producing an output signal when the compared intercharacter signal is represented by other than the preselected signal. Error indicating means responsive to the comparing means signal is provided for indicating a transmission equipment error.

*INVENTORS*
FRANCIS C. MARINO
EDWARD M. RICHARDS
EDWARD KRUMMENACKER
BY Yuter + Spiccens
ATTORNEYS

ERROR DETECTION APPARATUS

This invention relates generally to an error-detection apparatus and, more particularly, relates to an error-detection apparatus for detecting transmission equipment malfunctions in data communication or transmission systems.

The use of online data communication systems wherein data is transmitted from one point to a remote receiver via telephone transmission links or the like is multiplying at an explosive rate. For example, it is now quite common to transmit raw data from a plurality of remote locations to a central computer installation for processing as in a banking system wherein the banking transactions are transmitted from each branch office to a central computer facility located at the main offices of the institution. In order to eliminate the possibility of receiving erroneous information at the central processor or receiver, various error detection techniques have evolved, the most widespread of which is conventionally known as parity checking.

To be more specific, as is well known, most data is in the form of decimal numbers and/or alphabetic characters. These numbers and/or characters are encoded into combinations of bits. As an example, where only numbers are to be transmitted, each decimal digit is represented by a coded combination of four binary bits (digits) wherein each bit is either a "0" or a "1" depending upon the coded representation of the number. The "0" or "1" designation may be respectively represented by two different voltage levels or signals of two different frequencies or a transition between signals or the like. These bits are normally transmitted to the receiver serially or sequentially. However, in a parity checking arrangement, an extra or redundant parity bit is added to the coded combination so that each character comprises five rather than four binary bits which are transmitted to the receiver. For any one system, the parity may be odd or even. If the parity is odd the parity bit is chosen so that the total number of "1's" in any one character is odd. On the other hand, if the system utilizes an even parity, the parity bit is chosen so that the total number of "1's" comprising any one character (the five transmitted bits) is even. Parity checking apparatus in the receiver checks the number of "1's" in the received character to determine if the character has the correct parity and indicates an error if the parity is incorrect. While this arrangement is adequate for the detection of errors caused by the transmission medium due to, for example, noise or the like, it fails to detect errors which may arise due to malfunctioning equipment at the source; that is, the data recorder and/or the data transmitter per se.

More particularly, malfunctioning transmitter equipment may well produce an erroneous character having the correct parity. Such signals will not be detected by the parity checking apparatus and will be recorded as a correctly received signal. Obviously, such errors cannot be tolerated in any data communication system.

Accordingly, an object of this invention is to provide an improved error detection apparatus for a data communication system.

A more specific object of the invention is to provide an error-detection apparatus for detecting signal errors due to recorder and/or data transmitter malfunctions in addition to errors which may arise because of a noisy transmission medium or the like.

Another object of the present invention resides in the novel details of the system which provide an apparatus of the type described which is highly reliable and efficient in operation.

A further object of this invention is the provision of an error-detection apparatus which is compatible for use with existing data communications systems.

Accordingly, an error-detection apparatus constructed in accordance with the present invention is adapted for use in a data transmission system of the type having means for transmitting data in the form of sequential characters comprising combinations of at least first and second signals wherein the characters are separated by a preselected intercharacter signal and each character has a predetermined characteristic. The apparatus includes checking means which produces an output signal in response to the reception of a character having the predetermined characteristic. Storage means is provided for storing the preselected intercharacter signal. Comparing means compares the stored intercharacter signal with the succeeding intercharacter signals and is operable to produce an output signal if the compared signals are different.

Other features and advantages of the present invention will become more apparent from a consideration of the following detailed description when taken in conjunction with the accompanying drawing, in which.

Figure 1:
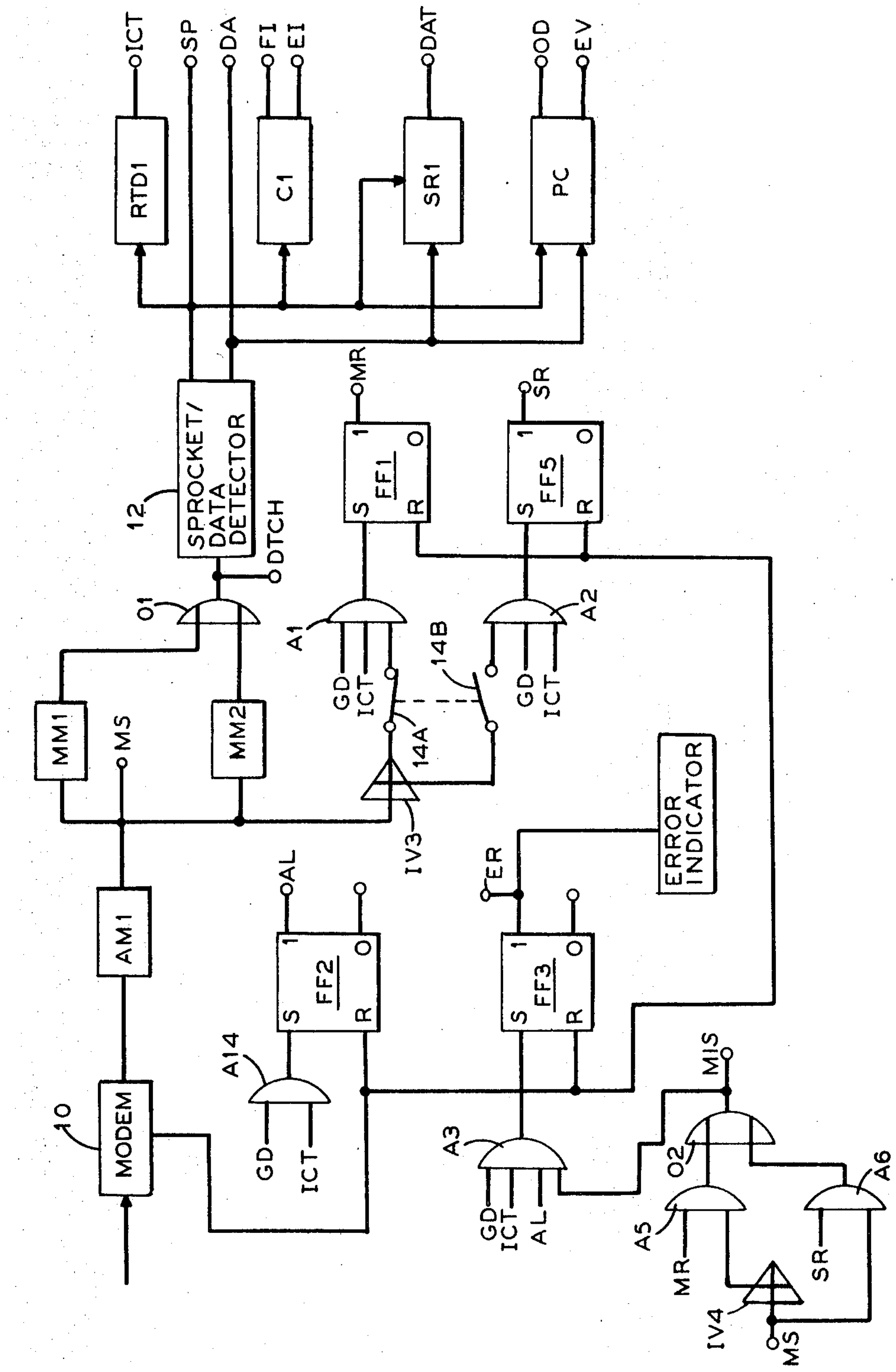
FIG. 1 is a schematic circuit diagram partially in block form of a portion of an error-detection apparatus constructed according to the present invention.

In the discussion which follows, it will be assumed that the detection apparatus of the present invention is used in conjunction with a data communications system which transmits data in binary form and is capable of transmitting numeric or alpha-numeric code. In each of these codes, the data information is transmitted as sequential characters wherein each character is spaced from the preceding and succeeding character by an intercharacter signal. As noted above, in the illustrative example, each digit in the numeric code is represented by four bits plus a redundant parity bit. Additionally, in order to fix the bit positions with respect to a benchmark for insuring the reliable interpretation of the bits representing the digit, it is necessary to provide what has become known as sprocket signals between each bit so that each character in the numeric code is represented by a total of 10 binary bits. In the alpha-numeric code each character comprises eight sprocket signals interleaved with eight bits of data, one of which is a parity bit. As noted above, the binary or "0" and "1" information in each code is represented by first and second signals which may be signals having different voltage levels or signals having different frequencies, or, in the system of the illustrative example, binary "1's" will be represented by a transition between first and second signals whereas a binary "0" will be represented by the absence of a transition. Additionally, the intercharacter signal may be represented by either the first signal or the second signal. However, once the intercharacter signal is selected for a particular code or transmission, it will remain constant throughout that particular transmission.

In the example under consideration, an odd parity is utilized for the numeric code but an even parity is utilized for the alpha-numeric code. As a result, the total number of transitions between the first and second signals in each character (representing the binary "1's") in either the numeric code or the alpha-numeric code will add up to an even number or, to put this another way, each character will exhibit the same characteristic.

To be more specific, in the numeric code there will be an odd (5) number of transitions representing the sprocket signals since each sprocket signal is represented by a "1." Since an odd parity is used in the numeric code, there will likewise be an odd number of transitions representing the data. Hence, the total number of transitions between first and second signals in a character in the numeric code will be an even number. Similarly, in the alpha-numeric code there will be an even number of transitions representing the eight sprocket signals. Since an even parity is used, there will also be an even number of transitions representing the data bits. Hence, each character in the alpha-numeric code will likewise have an even number of transitions between the first and second signals. As a result, the characters in either the numeric code or the alpha-numeric code will exhibit the same characteristic (i.e., an even number of transitions between first and second signals per character).

As a result of the above coding arrangement, it will be obvious that the intercharacter signal will always be represented by the same type of signal and will be assumed to be the first signal in the example under consideration. More particularly, the first intercharacter signal which is transmitted is assumed to be correct and is the first signal noted above. Since the character which follows this first intercharacter signal will have an even number of transitions between the first and second signals, the next intercharacter signal will similarly be represented by the first signal. Moreover, since each succeeding character has an even number of transitions, the intercharacter signal will be represented by the same first signal throughout the transmission. If it is assumed that the transmission medium is noisy, for example, and introduces an error into the received data information, the error may show up as a character having an incorrect parity at the receiver and it will be flagged as being in error by appropriate circuitry. However, since the information which leaves the data source is correct, the intercharacter signal still will be represented by the first signal.

If, however, the error is caused by the recorder or the transmitter per se or any other equipment at the data source, a character having an incorrect parity will be received and again will be flagged at the receiver as being in error. However, since the transmitter equipment produced the error, the erroneous character will have an odd number of transitions thereby to cause the next intercharacter signal to be represented by the second signal rather than the first. That is, the odd number of transitions following a correct intercharacter signal causes the next intercharacter signal to be transposed. If the following characters are transmitted correctly (i.e., with an even number of transitions), the intercharacter signal between each of these following characters will be represented by the second signal. Thus, the present invention describes apparatus which is operable to compare intercharacter signals following characters which do not contain errors to determine if the recorder or the transmitter (reader) has introduced any errors into the transmitted information as opposed to an error introduced by the transmission medium.

Accordingly, FIG. 1 illustrates a portion of an apparatus constructed according to the present invention which is adapted to detect recorder or transmitter (reader) errors in addition to errors caused by the transmission medium and includes a modem 10 or modulator-demodulator which demodulates the transmitted information to produce a signal which switches between first and second levels in accordance with the encoded information. The information from the modem is applied to an amplifier AM1 which amplifies the demodulated signal and produces a signal MS at the output thereof. The signal MS similarly is a signal which switches between a first level and the second level wherein each transition represents a "1."

The signal MS is applied to monostable multivibrators or one-shots MM1 and MM2. Multivibrator MM1 is adapted to produce a pulse when the signal MS switches from the first level to the second level and multivibrator MM2 is adapted to produce a pulse when signal MS switches from the second level back to the first level. The output terminals of the multivibrators MM1 and MM2 are connected to the respective input terminals of an OR gate 01 which produces an output signal DTCH at the output terminals thereof. The signal DTCH comprises a train of pulses representing the sprocket signals interleaved with the data bits in each character.

Figure 4:
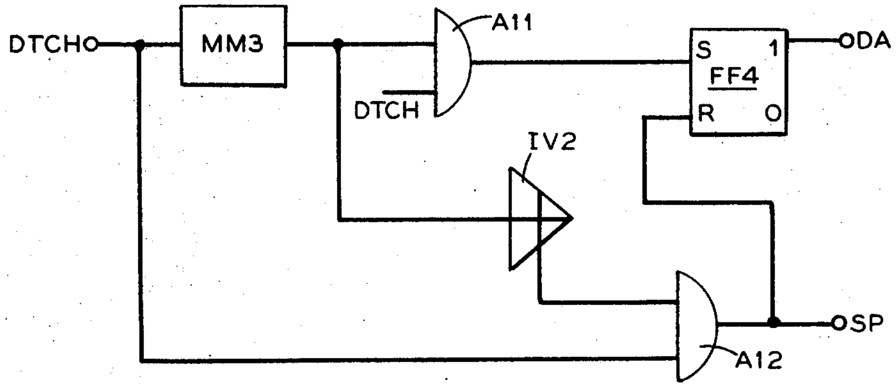
FIG. 4 is a circuit diagram of a detector for detecting data and sprocket bits.

The DTCH signal is applied to a sprocket/data detector 12. The sprocket/data detector 12 separates the sprocket pulses from the data bits in each character in the train of pulses comprising the signal DTCH. An illustrative sprocket/data detector is shown in FIG. 4. Thus, the output terminal of the OR gate 01 is connected to the input terminal of a monostable multivibrator MM3, the output terminals of which are connected to one input terminal of a two-terminal AND-gate A11. The DTCH signal is applied to the other input terminal of the AND-gate A11 and the output terminal thereof is connected to the set-to-one terminal S of a bistable multivibrator or flip-flop FF4. The flip-flop FF4 is a conventional Eccles-Jordan, bistable device which has a set-to-one input terminal S and a corresponding "1" output terminal and a set-to-zero input terminal R and a corresponding output terminal "0." Accordingly, when a signal is applied to the S terminal a signal will appear at the corresponding "1" output terminal. Similarly, when a signal is applied to the terminal R a signal will appear at the corresponding "0" output terminal. The "1" output signal of FF4 is designated the DA signal.

The DTCH signal also is applied to one input terminal of an AND-gate A12. Another input terminal of Gate A12 is connected to the output terminal of multivibrator MM3 through an inverting amplifier IV2. The inverting amplifier IV2 is conventional in construction and simply inverts or transposes the signal appearing at its input terminal at its inverting output terminal. That is, if the signal at the input terminal is a first level then the signal at the inverting output terminal will be at the second level. The output terminal of AND-gate A12 is connected to the set-to-zero terminal R of flip-flop FF4. The DA signal represents a data bit and AND-gate A12 is operable to produce an SP pulse at its output terminal representing a sprocket signal when both input terminals are energized.

When the first DTCH signal pulse is detected (which represents a sprocket signal) its trailing edge triggers the multivibrator MM3 which produces a pulse having a time interval which is equal to approximately three-quarters of the time interval between adjacent sprocket signals. If another DTCH signal occurs during this time interval it passes through the AND-gate A11 to the S terminal of flip-flop FF4 thereby producing a data pulse DA at the output thereof which represents a binary "1." The inverting amplifier IV2 prevents this data pulse from passing through the AND-gate A12. However, when the next DTCH occurs representing the next sprocket signal, the sprocket pulse passes through the AND-gate A12 to produce the sprocket pulse SP and to reset or set-to-zero the flip-flop FF4. As a result of the above-described operation, if a DTCH pulse appears between adjacent sprocket pulses it produces a binary "1" pulse. If no pulse appears between adjacent sprocket pulses, it is accepted as a binary "0."

Referring to FIG. 1, the SP signal is applied to the retriggerable time-delay device RTD1 which produces an ICT signal at the output thereof a preselected time interval after an SP pulse has been applied thereto. More particularly, the retriggerable time-delay device RTD1 produces a pulse after an interval equal to approximately twice the time interval between adjacent sprocket pulses after it has been triggered. Accordingly, while sprocket signals are being transmitted and an SP pulse is therefore being produced, RTD1 will not produce any pulse. However, during the intercharacter time interval, which is made to be greater than twice the time interval between adjacent sprocket pulses in a character, RTD1 will produce the ICT signal. In practice, the intercharacter time interval is equal to four times the sprocket pulse interval and the ICT signal interval is equal to twice the sprocket pulse intervals.

The SP pulse is also applied to a conventional counter C1 which counts the sprocket pulses and produces a signal FI if five sprocket pulses are counted, as when a numeric code is utilized. The counter C1 also produces a signal EI when eight sprocket pulses have been counted, as when an alpha-numeric code is utilized.

The DA signal is applied to a shift register SR1. The shift register SR1 is conventional in construction and may comprise an eight bit shift register for the storage of the data portion of each character. Shifting is produced by the SP signal which is applied to SR1 and which functions as a shift pulse. The shift register SR1 produces an output data signal DAT.

Parity checking is accomplished by the parity checking circuit PC which receives both the SP and DA signals. The parity checking circuit PC is conventional in construction and produces an output signal OD if the parity is odd and an output signal EV if the parity is even.

Figure 2:
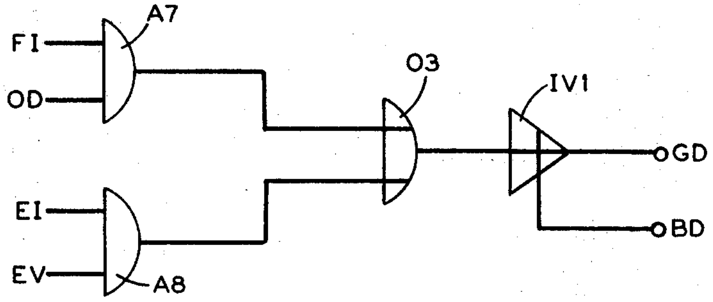
FIG. 2 is a logic circuit diagram of the characteristic checking portion of the apparatus.

As noted hereinabove, each character in the system under consideration has the same characteristic; that is, each character has an even number of transitions. Accordingly, the present invention includes means for checking each received character to determine if the received character has this preselected characteristic. More particularly, as shown in FIG. 2, the signals FI and OD are applied to the respective input terminals of an AND-gate A7. Similarly, the signals EI and EV are applied to the respective input terminals of an AND-gate A8. The output terminals of AND-gates A7 and A8 are applied to the respective input terminals of an OR-gate 03. The output terminal of gate 03 is applied to the input terminal of an inverting amplifier IV1. The inverting amplifier IV1 is adapted to produce an output signal GD at its noninverting output terminal or BD at the inverting output terminal depending upon the application of a signal applied to the input terminals of the amplifier.

In operation, assuming that the numeric code is utilized and there is no error in the received character, the signal FI will be applied to one input terminal of AND-gate A7 after the counter C1 has counted five sprocket pulses, and the signal OD will be applied to the other input terminal of AND-gate A7 after parity checking circuit PC has checked the parity of the character and the character has odd parity. Thus, a signal will be applied to the input terminal of inverting amplifier IV1 thereby to produce the signal GD at the output terminal thereof. Similarly, if an alpha-numeric code is utilized, the signals EI and EV will be applied to the AND-gate A8. As a result, a signal again will be applied to the input terminal of inverting amplifier IV1 thereby to again produce the signal GD at the output terminal thereof. However, if there is an error in the received signal, such as an alpha-numeric character having an odd parity, no signal will be applied to the input terminal of the inverting amplifier IV1. Accordingly, the inverting amplifier IV1 will produce a BD signal.

Figure 3:
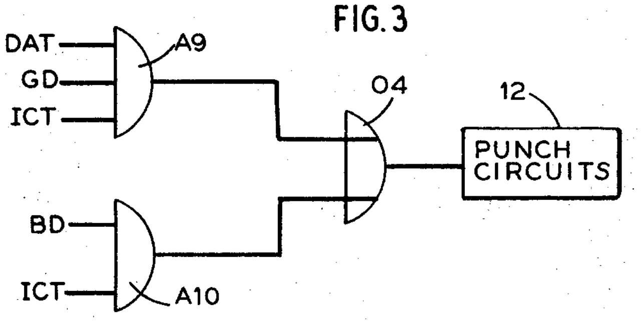
FIG. 3 is a partial logic diagram of the recording portion of the apparatus.

The receiver-recording circuits are adapted to record each character by reading out the contents of the shift register SR1 after the character is received. Moreover, the receiver is adapted to flag an erroneous character. More particularly, as shown in FIG. 3, input signals DAT, GD and ICT are applied to an AND-gate A9. The output signal of the AND-gate A9 is applied to the punch circuits 12 of the receiver through an OR-gate 04. If no error has been detected after a character has been received, the GD signal and the ICT signal will be applied to the AND-gate A9. Appropriate circuitry well known in the art and not forming a part of the present invention will cause the shift register SR1 to apply the DAT signals stored therein to the AND-gate A9. Accordingly, the data signals will pass through the OR-gate 04 to the punch circuits 12 to be punched out on an appropriate medium.

However, if an erroneous signal is received, the signal BD will be applied to the AND-gate A10 along with the signal ICT during the intercharacter interval. This signal will pass through the OR circuit 04 to the punch circuits 12 to energize the appropriate circuitry within the punch circuits 12 so that the appropriate character is flagged as being erroneous.

As noted above, if the recorder and/or the reader at the transmitting station or data source is producing erroneous characters, the intercharacter signal will change during the transmission of the information. This change is detected by the apparatus of the present invention to indicate malfunctioning equipment at the source to the operator of the system. To be more specific, the MS signal at the output of amplifier AM1 is applied to the input terminal of an inverting amplifier IV3. The noninverting terminal of the amplifier IV3 applies a noninverted output signal to one terminal of an AND-gate A1 through a single-pole single-throw switch 14A. The other input terminals of AND-gate A1 receive signals GD and ICT respectively. The output terminal of AND-gate A1 is connected to the set-to-one terminal S of a bistable multivibrator or flip-flop FF1. If a signal is applied to the S terminal of FF1, the bistable multivibrator produces an MR signal at the "1" output thereof. The inverting output terminal of the amplifier IV3 is connected to one input terminal of AND-gate A2 through a single-pole single-throw switch 14B. The other input terminals of AND-gate A2 receive the respective signals GD and ICT. The output terminal of AND-gate A2 is connected to the set-to-one terminal S of a flip-flop FF5. Accordingly, if a signal is applied to the S terminal of FF5, the flip-flop will produce an SR signal at the "1" output thereof.

The switches 14A and 14B are ganged so that when one switch is closed the other is open. Before receiving any data from the remote source, the operator closes one of the switches 14A or 14B in accordance with which signal represents the intercharacter signal. Thus, if the intercharacter signal is represented by a first signal, switch 14A is closed. On the other hand, if the intercharacter signal is represented by a second signal, switch 14B is closed. In the example under consideration it will be assumed that switch 14A is closed and, therefore, switch 14B is open. Furthermore, it will be assumed that the last signal applied to FF1 was applied to the set-to-zero terminal R, as noted in detail below. Moreover, it is to be understood that the manually operated switches 14A, 14B may be replaced by appropriate logic circuitry to automate this operation.

If a character having the correct characteristic is received, the GD signal is generated by the appropriate circuitry, as noted above. Additionally, during the intercharacter time interval the ICT signal is generated. If, during the generation of the GD and ICT signals, the first signal is received representing the intercharacter signal, the AND-gate A1 will pass a signal to the S terminal of flip-flop FF1 to generate the MR signal. It is to be noted that the MR signal will not be generated until at least one nonerroneous character has been received.

The operation of flip-flop FF5 when the switch 14B is closed and the second signal is received during the intercharacter time is similar to flip-flop FF4 and is not described in detail.

Signals MR and SR are respectively applied to input terminals of AND-gates A5 and A6. Signal MS is applied to the other terminal of gate A6 and is inverted by inverting amplifier IV4 and is applied to the other input terminal of AND-gate A5. The terminals of gates A5, A6 are connected to the input terminals of an OR-gate 02 which is adapted to produce an MIS signal if a signal is applied to one or both of its input terminals. The MIS signal is applied to one input terminal of an AND-gate A3. Additionally, signals GD, ICT and an AL signal are respectively applied to other input terminals of the AND-gate A3. The output terminal of AND-gate A3 is connected to the set-to-one terminal S of a bistable multivibrator or flip-flop FF3. The flip-flop FF3 is adapted to produce an ER or error indicating signal at the "1" output when a signal is applied to the S terminal.

From a consideration of the above, it will be obvious that the flip-flops FF1 or FF5 function as storage elements which store the type of intercharacter signal received. Additionally, the AND-gates A5 and A6 and the related components compare this stored intercharacter signal with succeeding signals and produce an output if the signals are different. However, since the signals at the output terminals of gates A5 and A6 are applied to an AND-gate A3 to which the intercharacter time signal ICT is applied, the only time the said comparison is effective is during the intercharacter period. Thus, these latter elements are operable to compare the stored intercharacter signal with the succeeding intercharacter signals and to produce an error signal ER if a mismatch is detected.

It is desirable to disable the source error detection portion of the apparatus until at least one character having the proper characteristic is received. Accordingly, when the modem or modulator-demodulator 10 switches from the talk operation to the data-receiving operation a signal is applied to the set-to-zero terminals R of flip-flops FF1, FF3, FF5 and to the terminal R of a bistable multivibrator or flip-flop FF2. The set-to-one terminals of the flip-flop FF2 is connected to the output terminal of an AND-gate A14 the two input terminals of which are adapted to receive the signals GD and ICT, respectively. When a signal is applied to the S terminal of the flip-flop FF2, the multivibrator produces an AL signal at the "1" output thereof. Thus, when a character having the proper characteristic is received, the GD signal will be produced. During the intercharacter time interval the signal ICT will be present thereby producing an output signal at the AND-gate A14 which energizes the S terminal of flip-flop FF2 to produce the AL signal. Since the AL signal is applied to the AND-gate A3, the flip-flop FF2 will essentially disable the error indicating circuitry until the GD signal is produced (i.e., until a character having the proper characteristic is received).

While the operation of the present invention will be apparent from a consideration of the above, for the sake of completeness it will be summarized below. Accordingly, in operation, when the modem 10 switches from talk to receive, a signal is applied to the R terminals of flip-flops FF1, FF5, FF2 and FF3. Assuming that a character having the correct characteristic is received, the GD signal will be generated. If, on the other hand, the character does not have the proper characteristic, the BD signal will be generated and the erroneous character accordingly would be flagged. However, assuming the GD signal is present, during the intercharacter time the ICT signal is generated. Hence, a signal is applied to the S terminal of FF2 thereby generating the AL signal. Simultaneously therewith, if the intercharacter signal is correct, an output pulse appears at AND-gate A1 which causes flip-flop FF1 to generate the MR signal.

If the next received character has the proper characteristic, the next succeeding intercharacter signal is compared with the stored signal MR in the manner indicated below and, if it is correct, no action is taken. However, if it is assumed that the next received character has an improper or erroneous characteristic due to the noise in the transmission medium, for example, the BD signal will be generated. Since the GD signal is not applied to AND-gate A3 at this time no signal can be applied to the S terminal of the error-indicating flip-flop FF3.

However, if the error introduced into the character is due to malfunctioning transmitter equipment such as the recorder or reader, a transposition of the intercharacter signal may occur. That is, as noted in detail above, if one character is sent correctly and the next character is transmitted with an odd number of transitions, the intercharacter signal will change from the first to the second signal in the illustrative example. If the succeeding character has an even number of transitions the intercharacter signal will remain represented by the second signal. Thus, when this next succeeding character having the correct characteristic is received followed by the transposed intercharacter signal, AND-gate A5 will produce the MIS signal via OR-gate 02. Accordingly, signals will be applied to all four input terminals of AND-gate A3 which applies a pulse to the S terminal of flip-flop FF3 which then generates the ER signal. The ER signal is applied to an error indicator 14 which may comprise an audio or visual indicating device to notify the operator of the error. Additionally, the error signal ER may be connected to a counter to register the number of times the error signal occurs.

Accordingly, an error-detection apparatus has been disclosed which detects transmitter errors due to malfunctions in the transmitter equipment such as the recorder and/or the reader.

Since the various elements shown comprising the apparatus are made up of standard components, and standard assemblies, reference may be had to "High Speed Computing Devices," by the staff of Engineering Research Associates, Inc., McGraw-Hill Book Company, Inc., 1950, and appropriate chapters in "Computer Handbook," McGraw-Hill, 1962, edited by Harvey D. Huskey and Granino A. Korn; and for detailed circuitry to, for example, "Principles of Transistor Circuits," edited by Richard F. Shea, published by John Wiley & Sons, Inc., New York, and Chapman and Hall, Ltd., London, 1953 and 1957. In addition, other references are: for system organization and components: "Logic Design of Digital Computers" by M. Phister, Jr. (John Wiley & Sons, New York); "Arithmetic Operations in Digital Computers," by R. K. Richards (D. Van Nostrand Company, Inc., New York). For circuits and details: "Digital Computer Components and Circuits," by R. K. Richards (D. Van Nostrand Company, Inc., New York).

In addition, although power supplies, interlocks, protective devices and on-off switches have not been shown, such elements are obviously included in such a system in accordance with good engineering practice. Since such elements and techniques are obvious to those skilled in the art, they have not been shown so as to not becloud the basic teaching of the inventive concept.

While preferred embodiments of the invention have been shown and disclosed it will be obvious that numerous omissions, changes and additions may be made in such embodiments without departing from the spirit and scope of the present invention. For example, it will be apparent that the apparatus of the present invention may be adapted for use in transmission systems of types other than the transmission system disclosed. That is, it will be obvious that the present apparatus may also be adapted for use with a system having an odd number of transitions per character rather than an even number of such transitions.

What is claimed is:

1. Error-detection apparatus for a transmission system of the type having means for transmitting information in the form of characters comprising combinations of at least first and second signals wherein adjacent characters are separated by an intercharacter signal represented by at least a first or second logic signal and each character has a predetermined characteristic, said apparatus including receiving means for receiving said transmitted information, storing means connected to said receiving means for storing a preselected one of said first and second logic signals, and comparing means connected to said receiving means and said storing means for comparing said stored signal with at least a succeeding intercharacter signal and for producing an output signal if said succeeding intercharacter signal is other than said preselected one of said first and second logic signal.

2. Error-detection apparatus as in claim 1, and checking means connected to said receiving means for producing a check signal in response to a character having said predetermined characteristic.

3. Error-detection apparatus as in claim 2, and error indicating means responsive to said check signal and said comparing means signal for generating an error signal.

4. Error-detection apparatus as in claim 2, in which each of said characters contains information representing data and sprocket signals, said data information having a desired parity and said sprocket information having a desired number, said predetermined characteristic being dependent upon said desired parity and said desired number; said checking means including parity means responsive to data information having said desired parity for producing a first parity signal, counting means responsive to said desired number of sprocket information for producing a signal, and means responsive to the concurrence of said first parity signal and said counting means signal for producing said check signal.

5. Error-detection apparatus as in claim 4, wherein said parity means is operable to produce a second parity signal when said data information does not have said desired parity, and means responsive to said second parity signal for designating said data information is of the incorrect parity.

6. Error-detection apparatus as in claim 2; and signal-generating means for generating a signal during the time said intercharacter signal is received; said storing means including means responsive to said generating means signal, said check signal and said preselected one of said first and second logic signal for generating said stored preselected one of said first and second logic signals.

7. Error-detection apparatus as in claim 6, further including enabling means responsive to said generating means signal and said check signal for generating an enabling signal; and error-indicating means responsive to the concurrence of said comparing means signal, said enabling signal, said generating means signal and said check signal for generating an error signal.

8. Error-detection apparatus for a receiver in a transmission system of the type including means for transmitting information in the form of characters comprising combinations of transitions between first and second signals wherein adjacent characters are separated by an intercharacter signal represented by a first logic signal and each character has a preselected characteristic; said apparatus comprising receiving means for receiving said transmitted information; a signal generator connected to said receiving means for generating a signal during the intercharacter time interval; checking means connected to said receiving means responsive to a character having said predetermined characteristic for producing a check signal; storing means responsive to said generated signal, said check signal and said first logic signal signal for storing said first logic signal; and comparing means connected to said receiving and storing means for comparing said stored first logic signal with succeeding intercharacter signals and for producing a comparing means signal if any of said succeeding intercharacter signals are not said first logic signal.

9. Error-detection apparatus as in claim 8, in which each character comprises a data information portion and a sprocket information portion, said data information portion having a desired parity, said sprocket information portion being represented by a selected number of said transitions, said checking means including detection means for separating data and sprocket information, a parity circuit responsive to the data information portion of a character having the desired parity for producing a first parity signal and responsive to the data information portion of a character having other than said desired parity for producing a second parity signal, counting means responsive to said selected number of transitions of said sprocket information portion of said character for producing a signal in response thereto, and means responsive to the concurrence of said first parity signal and said counting means signal for producing said check signal.

10. Error-detection apparatus as in claim 9, including recording means for recording the data information portion of each character, and means responsive to said second parity signal for indicating an error on said recording means.

11. Error-detection apparatus as in claim 8, including enabling means responsive to the concurrence of said check signal and said generated signal to produce an enabling signal; and error means responsive to the concurrence of said check, generated, enabling and comparing means signals for generating an error signal.

12. A method for detecting transmission equipment errors in a transmission system of the type having means for transmitting information in the form of characters comprising combinations of first and second signals wherein adjacent characters are separated by an intercharacter signal represented by a preselected logic signal and each character has a predetermined characteristic, said method including checking each received character for said predetermined characteristic and generating a check signal in response thereto, storing said preselected logic signal after said check signal is generated, and comparing said stored signal with the next intercharacter signal after a check signal has been generated to produce a signal if said next intercharacter signal is other than said preselected logic signal.

13. A method as in claim 12, including the further step of generating an error signal during the next intercharacter signal when said check signal is generated and said intercharacter signal is other than said preselected logic signal.